United States Patent [19]
Maughan

[11] Patent Number: 6,164,861
[45] Date of Patent: Dec. 26, 2000

[54] BEARING SET FOR A BALL JOINT ASSEMBLY

[75] Inventor: Garth B. Maughan, Delta, Ohio

[73] Assignee: Dana Corporation, Toledo, Ohio

[21] Appl. No.: 09/041,906

[22] Filed: Mar. 13, 1998

[51] Int. Cl.[7] ............................................. F16C 11/00
[52] U.S. Cl. ......................... 403/135; 403/140; 403/133
[58] Field of Search ................................ 403/122, 123, 403/132, 133, 134, 135, 140

[56] References Cited

U.S. PATENT DOCUMENTS

| | | |
|---|---|---|
| 3,554,586 | 1/1971 | Cutler . |
| 3,677,587 | 7/1972 | Schmidt et al. . |
| 3,909,084 | 9/1975 | Snidar et al. . |
| 4,353,660 | 10/1982 | Parks . |
| 4,564,307 | 1/1986 | Ito . |
| 4,615,638 | 10/1986 | Ito . |
| 4,695,181 | 9/1987 | Rahmede et al. ................. 403/133 |
| 4,750,885 | 6/1988 | Ito . |
| 4,875,794 | 10/1989 | Kern, Jr. ........................... 403/140 |
| 5,188,476 | 2/1993 | Mori . |
| 5,368,408 | 11/1994 | Shimizu et al. . |
| 5,772,337 | 6/1998 | Maughan et al. ................. 403/140 |

*Primary Examiner*—Terry Lee Melius
*Assistant Examiner*—Kenneth Thompson
*Attorney, Agent, or Firm*—Rader, Fishman & Grauer PLLC

[57] ABSTRACT

A bearing set for a ball and socket joint comprises an inner and outer bearing with a head of a ball stud engaging an inner seat face of each of the bearings. An axial compression preload results when the bearing set and ball stud are inserted into a socket and the socket is closed. To eliminate internal machining of the socket to precise tolerances, the outer peripheral surfaces of the bearings are provided with a plurality of deformable alternating ribs and grooves. The ribs cooperate with the grooves to conform the bearings to the dimensions of the socket and produce and preload the ball and socket joint assembly.

18 Claims, 3 Drawing Sheets

BEARING SET FOR A BALL JOINT ASSEMBLY

FIELD OF THE INVENTION

The present invention relates generally to ball and socket joint assemblies. More particularly, this invention relates to an annular bearing set for a ball and socket joint assembly, each bearing including alternating vertical ribs and grooves defined on an outer peripheral surface of the bearings, the ribs selectively deforming into adjacent grooves when the bearing is pressed against a mating surface.

BACKGROUND OF THE INVENTION

Ball and socket joints are used in a variety of applications, including rack and pinion inner tie rod socket assemblies, steering knuckles, drag links, and connecting rod assemblies. Ball and socket joints typically include a generally cylindrical socket member adapted to receive one or more bearings together with a head of a ball stud. The bearing reduces the degree of friction between the socket and ball stud head and is sometimes used to compensate for wear between the stud and socket member by way of a compression preload.

Ball and socket joints have known disadvantages. In particular, the internal surface of the socket must be machined to precise tolerances to ensure a proper bearing fit that is capable of accommodating joint loading and motion requirements. Further, close tolerances are necessary to provide satisfactory wear-life parameters, such as low axial and radial end play under long term load.

To overcome these disadvantages, some ball and socket joints have been provided with bearings having deformable elevations or projections disposed about an outer surface of the bearing to compensate for production tolerances of the joint parts. One known bearing includes elevations in the form of ribs and bars on an outer circumferential surface of bearing, arranged alternating with each other and separated by axially extending grooves. The bars have a greater circumferential width than that of the ribs while the ribs have a greater radial extent that that of the bars. When the bearing is assembled within the socket, the bars bear against the socket only if significant short term loads are acting on the joint. However, known bearings of this type are disadvantageous because the alternating sizes of the elevations produce locally dense high spots on the inside surface of the bearing due to the varying concentrated areas of deformation.

Another known bearing for a ball and socket joint utilizes a plurality of dot or band shaped protrusions which extend circumferentially about an outer surface of a bearing. However, the rings of protrusions are spaced along a central axis. The localized protrusions provide local deformation. There are neither intended nor useable for full surface deformation coverage in a full cavity of the socket. Further, the protrusions require high assembly preloading to deform the protrusions. The high preload in combination with the design of the protrusions creates inner surface problems such as locally dense high spots, thereby causing a likelihood of increased torque variations and more rapid wear of an inner seat surface for the stud.

Therefore, there exists a need for a bearing that can eliminate precise internal machining requirements of the socket in a ball and socket joint, but still produce satisfactory joint integrity without compromising joint performance.

SUMMARY OF THE INVENTION

The present invention is directed to an improved ball and socket joint which includes a two-piece bearing set that reduces the need for precise tolerances within an internal cavity of the socket.

The bearing set comprises an inner bearing and an outer bearing, each of the bearings having opposing axial surfaces and inner seat faces. The outer bearing includes a generally cylindrical skirt that defines a cavity. The cavity tapers at a lower end of the skirt to form the inner seat face. A head of a ball stud engages the inner seat face. The inner bearing is inserted into the cavity of the outer bearing such that the inner seat face of the inner bearing comes in contact with the head of the ball stud. The inner bearing has a generally cylindrical outer peripheral surface with an unloaded diameter greater than an unloaded diameter of the cavity of the outer bearing.

Once the bearing set is assembled with the ball stud, the bearing set is inserted within a socket and the socket is sealed to apply an axial compression preload upon the bearing set. To ensure a proper fit between the bearing set and the socket without requiring an expensive internal machining step to precise tolerances, the bearings are provided with alternating ribs and grooves. In the outer bearing, the outer peripheral surface is provided with alternating ribs and grooves that are equally spaced apart and extend vertically between the opposing axial surfaces such that the ribs run the length of the outer bearing and are parallel to an axis of symmetry extending through the socket joint. The ribs and grooves are preferably formed in a uniform sinusoidal pattern wherein the height of the ribs equals and is complimentary to the depth of the grooves, thus achieving uniform deformation of the ribs when the bearing set is pressed into the socket. Uniform deformation of the ribs is highly desirable as it reduces the possibility of localized dense high spots on the internal surface of the outer bearing, thereby prolonging the wear life of the inner seat face. The ribs and grooves serve to conform the outer peripheral surface of the outer bearing to the dimensions of the cavity in the socket, thereby compensating for variations in the cavity dimensions.

The inner bearing also includes vertically extending alternating ribs and grooves that operate in a manner similar to those of the outer bearing. The inner bearing compliments the outer bearing in conforming the bearing set to the dimensions of the inner peripheral surface of the socket cavity. Preferably, the outer peripheral surface of the inner bearing is slightly tapered such that when bearing set is assembled and inserted into the socket, a nominal amount of the outer bearing flows towards the top of the stud head of the ball stud during assembly, thereby making the ball and socket joint easier to assemble.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
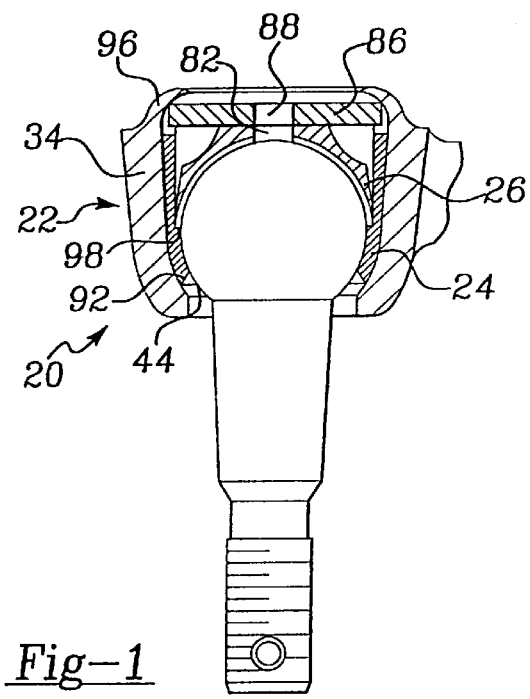
FIG. 1 is a cross-sectional view of a ball and socket joint in accordance with the present invention.
Figure 2:
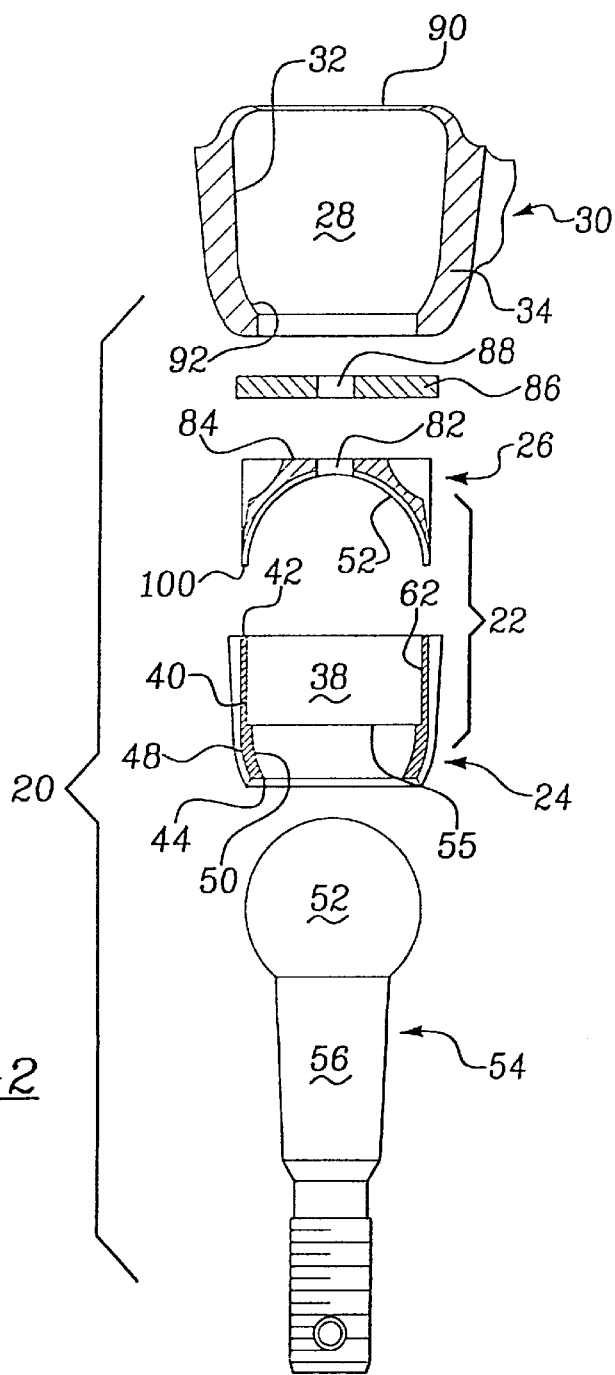
FIG. 2 is a cross-sectional exploded view of the ball and socket joint showing the various joint components.

A ball and socket joint 20 which includes a two-piece bearing set 22 is shown in FIGS. 1 and 2. Bearing set 22 has an outer bearing 24 and an inner bearing 26. Bearings 24 and 26 are received in a cavity 28 of a socket 30. Cavity 28 is defined by an inner peripheral surface 32 of a socket side wall 34. Cavity 28 extends axially about an axis of symmetry through socket 30.

Figures 3, 4:
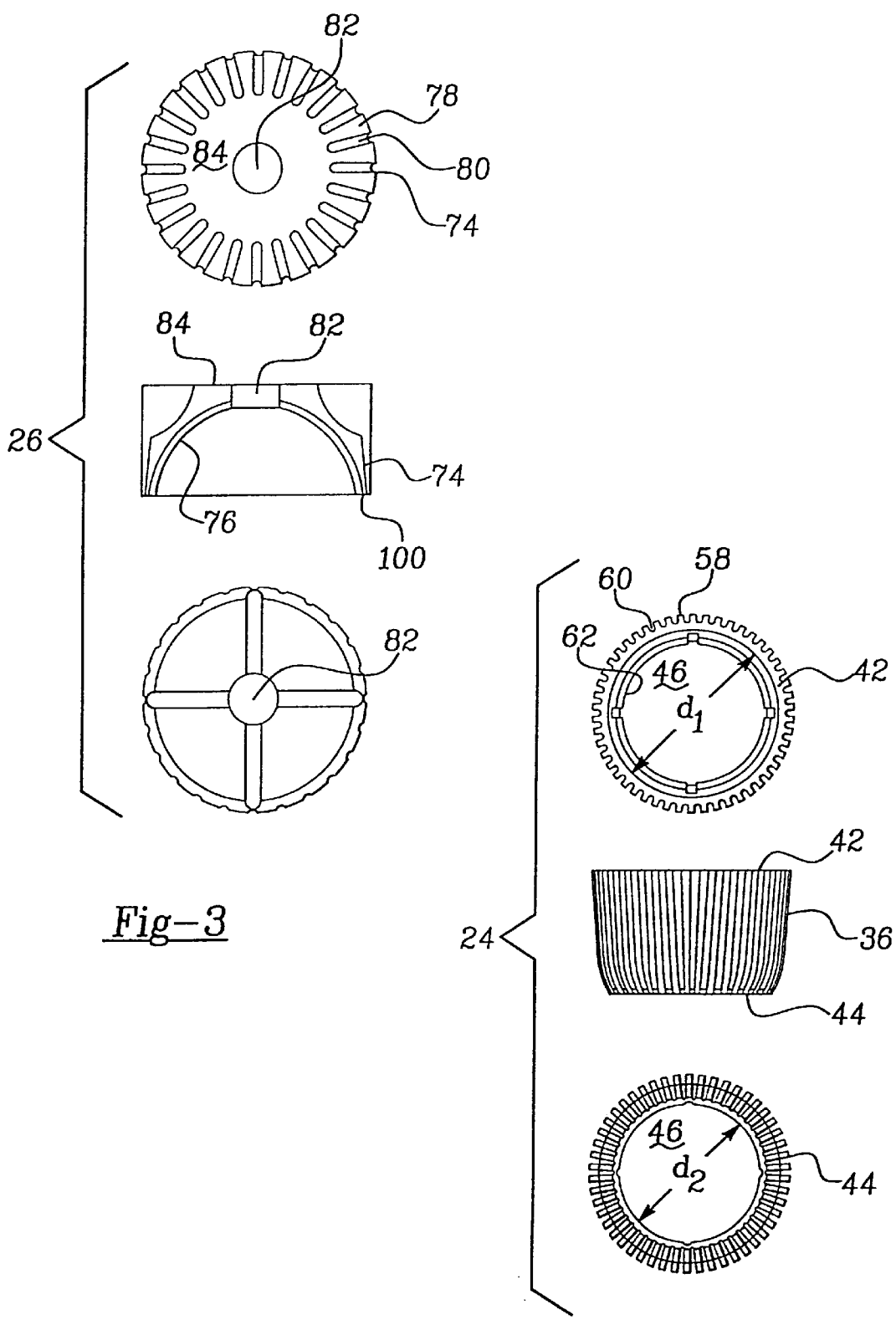
FIG. 3 depicts planar and elevational views of an inner bearing.
FIG. 4 depicts planar and elevational views of an outer bearing.

Referring to FIGS. 2 and 4, outer bearing 24 includes an outer peripheral surface 36 which is adapted to conform to inner peripheral surface 32 of cavity 28. A cavity 38 is defined within outer bearing 24 by a generally cylindrical skirt 40 which extends about the axis of symmetry of socket cavity 28. Skirt 40 has a first axial surface 42 and an opposing second axial surface 44. An aperture 46 extends through outer bearing 24, having a first diameter d1 at first axial surface 42 and a second diameter d2 at second axial surface 44. Second diameter d2 is smaller than first diameter d1 such that a lower end 48 of skirt 40 tapers slightly inward to form an inner seat face 50 that engages a spherical stud head 52 of a ball stud 54. A transition zone 55, which bisects cavity 38, forms lower end 48 and thus inner seat face 50. A shank 56 of ball stud 54 passes through aperture 46 such that stud head 52 engages inner seat face 50.

Outer bearing 24 includes a plurality of alternating deformable ribs 58 and radially inwardly extending grooves 60 formed on outer peripheral surface 36. Ribs 58 and grooves 60 are equally spaced from one another and vertically oriented so as to be positioned parallel to the axis of symmetry. Grooves 60 are spaced radially outward from aperture 46 such that grooves 60 do not intersect an inner periphery 62 of aperture 46. When outer bearing 24 is pressed into cavity 28, ribs 58 are compressed and deformed into adjacent grooves 60 such that outer peripheral surface 36 conforms to the dimensions of cavity 28, thereby compensating for variations in the dimensions for cavity 28. Thus, bearing 24 fits tightly in cavity 28 without requiring an extra internal machining step for cavity 28 of socket 30, such that manufacturing costs are reduced. Preferably, ribs 58 and grooves 60 extend from first axial surface 42 to second axial surface 44 such that ribs 58 and grooves 60 run the length of outer bearing 24, thereby ensuring a tight fit of outer bearing 24 all along outer peripheral surface 36.

Figure 7:
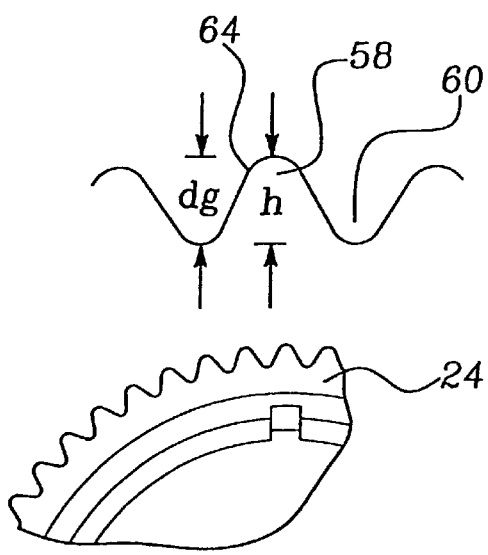

In a preferred embodiment, ribs 58 and grooves 60 are formed in a uniform sinusoidal pattern on outer peripheral surface 36 so as to be wave-shaped as seen in FIG. 7 with ribs 58 having a height h that is uniform throughout the entire length of ribs 58. Further, height h of ribs 58 is equal to a depth $d_g$ of grooves 60 such that ribs 58 and grooves 60 are substantially identical in shape and size to produce uniform deformation of outer peripheral surface 36. Uniform deformation minimizes the possibility of localized dense high spots on the internal surface of outer bearing 24, thereby prolonging the wear life of inner seat face 50 of outer bearing 24. Wave-shaped ribs 58 have rounded ends 64, such that there are no edges. Rounded ends 64 reduce stress imposed forces during the deformation of ribs 58. Wave-shaped ribs 58 and grooves 60 operate to tightly fit outer bearing 24 into cavity 28 up to a very high tolerance range.

Figure 5:
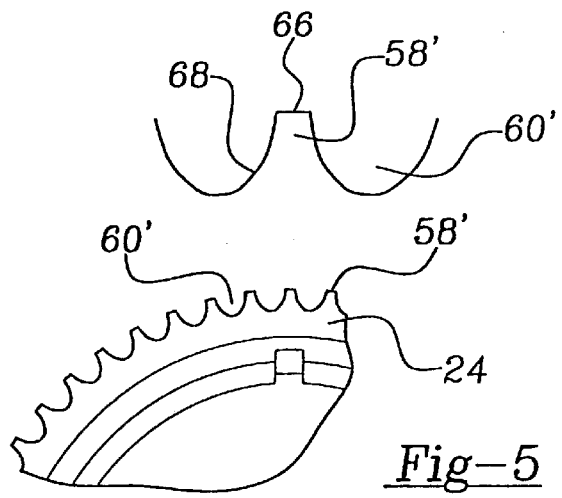
FIGS. 5–7, are top partial planar views of the outer bearing showing various rib and groove configurations in accordance with the present invention.
Figure 6:
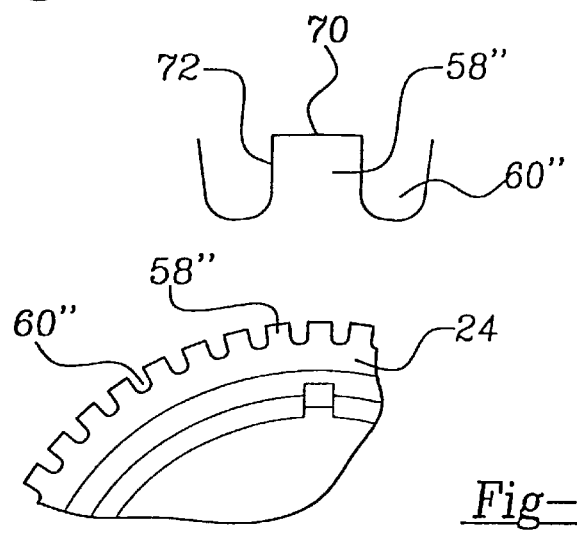

FIGS. 5 and 6 illustrate alternative configurations for ribs 58 and grooves 60. FIG. 5 shows ribs 58' having a narrow flat end 66 defined by arcuate sidewalls 68. Arcuate sidewalls 68 of adjacent ribs 58' meet to form wide unshaped grooves 60'. Ribs 58' of the configuration of FIG. 5 compensate for a slightly higher tolerance range as compared to the embodiment of FIG. 7. Alternatively, ribs 58" could be formed with a wide flat end 70 defined by substantially planar sidewalls 72 that form narrow unshaped grooves 60", as seen in FIG. 6. Ribs 58 of the configuration of FIG. 6 compensate for a slightly lower tolerance range as compared to the embodiment of FIG. 7.

Preferably, in the alternative configurations for ribs 58 and grooves 60, grooves 60' and 60" are constructed to be somewhat deeper than the expected deformation that ribs 58' and 58" will experience when outer bearing 24 is positioned in cavity 28 of socket 30. The increased depth $d_g$ of grooves 60' and 60" permits a wide range of interference levels between bearing set 22 and cavity 28. The groove depth $d_g$ is approximately 20%–25% more than the maximum expected interference between bearing set 22 and socket cavity 28.

Inner bearing 26, as shown in FIG. 3, includes a generally cylindrical outer peripheral surface 74, an unloaded diameter of which is slightly greater than the corresponding unloaded diameter of cavity 38 of outer bearing 24. Further, inner bearing 26 is also provided with an inner seat face 76 that engages stud head 52 once inner bearing 26 is mated with outer bearing 24. Inner seat faces 50 and 76 have a common diameter to secure stud head 52 and to limit the degree of rotational motion.

Preferably, outer peripheral surface 74 of inner bearing 26 is slightly tapered to allow for a nominal amount of outer bearing 24 inward flow towards the top of stud head 52 during press-fitting, to be described later in greater detail. Thus, any potential over stressing of bearing set 22 is eliminated. Further, outer peripheral surface 74 also includes vertical alternating deformable ribs 78 and grooves 80. Ribs 78 and grooves 80 of inner bearing 26 operate in a manner similar to those in outer bearing 24. Ribs 78 and grooves 80 compliment the effect of ribs 58 and grooves 60 on outer peripheral surface 36 of outer bearing 24 to conform bearing set 22 to inner peripheral surface 32 of cavity 28.

To aid in lubrication of ball joint 20, inner bearing 26 is provided with an opening 82 that is aligned with the axis of symmetry of socket 30 and which extends axially between inner seat face 76 and an upper axial surface 84. Opening 82 serves to supply lubricant to ball and socket joint 20.

An annular retaining ring 86 is also provided. Retaining ring 86 engages upper axial surface 84 of inner bearing 26. An opening 88, which corresponds to and is aligned with opening 82 of inner bearing 26 receives a fitting (not shown) for supplying the lubricant to ball and socket joint 20.

A cross-sectional view of the assembled ball and socket joint 20 is illustrated in FIG. 1. To assemble ball and socket joint 20, shank 56 is positioned to extend through aperture 46 of outer bearing 24 until stud head 52 contacts inner seat face 50. Inner bearing 26 is then forced into cavity 38 until inner seat face 76 of inner bearing 26 contacts stud head 52. Bearing set 22 and ball stud 54 is then inserted into cavity 28 of socket 30, with shank 56 passing through an aperture 90 in socket 30 and second axial surface 44 of outer bearing 24 engaging a floor 92 of socket 30. Retaining ring 86 is positioned in contact with upper axial surface 84 of inner bearing 26. An axial load is applied to retaining ring 86 which is transferred to first axial surface 42 of outer bearing 24 to provide an axial compression "press-fit" preload to bearing set 22. As bearing set 22 is press-fit into cavity 28, ribs 58 and 78 of outer and inner bearings 24 and 26, respectively, deform into grooves 60 and 80. The deformation forces bearing set 22 to conform to inner peripheral surface 32 of socket 30. The compression preload is transferred from bearing set 22 to inner peripheral surface 32. Once ball and socket joint 20 components are properly positioned, an annular lip 96 of socket 30 is crimped about retaining ring 88, thereby closing socket 30. Lip 96 is sized to ensure adequate resistance against severe loading "push out."

An optional annular pocket 98 may be formed between outer bearing 24 and inner bearing 26. As best shown in FIG. 1, annular pocket 98 is formed by transition zone 55 and skirt 40 of outer bearing 24 together with a lower axial surface 100 of inner bearing 26 and stud head 52. Pocket 98 serves as a lubricant well.

Bearing set 22 may be constructed from a wide range of materials, depending on the individual application and the appropriate internal assembly force retention required during joint usage. Possible materials are crosslinkable polyethylene, polytetrafluroethylene filled nylons, polytetrafluroethylene filled acetals and polyurethanes. Other materials that have high elongation under load can also be used.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A bearing for use in a ball and socket joint, comprising:
   an outer peripheral surface;
   a first axial surface;
   a second axial surface opposing said first axial surface;
   an inner seat face; and
   a plurality of alternating deformable ribs and radially inwardly extending grooves formed on said outer peripheral surface and equally spaced from one another, said ribs and said grooves extending between said opposing axial surfaces so as to be parallel to an axis of symmetry extending through said bearing.

2. A bearing as in claim 1, wherein said ribs extend between said opposing axial surfaces so as to run the entire length of said bearing.

3. A bearing as in claim 1, wherein said ribs and grooves are formed in a sinusoidal pattern on said outer peripheral surface such that the depth of said grooves is equal to and complimentary to the height of said ribs.

4. A bearing as in claim 1, wherein all of said ribs have a substantially uniform height along the entire length of said ribs.

5. A bearing as in claim 1, wherein said ribs are formed with rounded ends such that there are no edges on said ends.

6. A bearing as in claim 1, wherein said first axial surface has an aperture formed therein, said aperture defining a first diameter.

7. A bearing as in claim 6, wherein said second axial surface has an aperture formed therein, said aperture of said second axial surface defining a second diameter, said second diameter being smaller than said first diameter to define said inner seat face.

8. A bearing set for use in a ball and socket joint, comprising:
   an inner bearing having an outer peripheral surface, two opposing axial surfaces, and a spherical inner seat face,
   an outer bearing having an outer peripheral surface, two opposing axial surfaces, a spherical inner seat face, and a plurality of alternating deformable ribs and radially inwardly extending grooves formed on said outer peripheral surface of said outer bearing and equally spaced from one another, said ribs and said grooves extending between said opposing axial surfaces so as to be parallel to an axis of symmetry extending through said bearing.

9. A bearing set as in claim 8, wherein said ribs and grooves are formed in a sinusoidal pattern on said outer peripheral surface such that the depth of said grooves is equal to and complimentary to the height of said ribs.

10. A bearing set as in claim 9, wherein all of said ribs have a substantially uniform height along the entire length of said ribs.

11. A bearing set as in claim 10, wherein said ribs are rounded such that there are no edges.

12. A bearing set as in claim 8, wherein said grooves have a depth that is greater than a pre-determined deformation range of said ribs when said bearing is positioned within a socket cavity.

13. A bearing set as in claim 12, wherein said depth is approximately 20%–25% greater than said pre-determined deformation range of said ribs.

14. A ball and socket joint, comprising:
   a socket;
   an outer bearing axially compressed within said socket, said outer bearing having an outer peripheral surface, two opposing axial surfaces, a first spherical inner seat face, a generally cylindrical skirt that defines a cavity, and a first plurality of alternating deformable ribs and radially inwardly extending grooves formed on said outer peripheral surface and extending between said opposing axial surfaces so as to be parallel to an axis of symmetry that extends through said outer bearing, said ribs and grooves equally spaced from one another and forming a sinusoidal pattern to conform said outer peripheral surface of said outer bearing to an inner peripheral surface of said socket;
   an inner bearing received in said outer bearing, said inner bearing having an outer peripheral surface, two opposing axial surfaces, a second inner seat face, and a second plurality of deformable alternating ribs and radially inwardly extending grooves extending between said opposing axial surfaces and parallel to an axis of symmetry that extends through said inner bearing, said ribs and grooves equally spaced from one another and serving to conform said outer peripheral surface of said inner bearing to said skirt of said outer bearing;
   a ball stud with a spherical stud head and a shank, said stud head engaging each of said seat faces of said outer and inner bearings; and
   a closure to retain said outer and inner bearings and said spherical stud head within said socket, wherein said bearings are axially compressed within said socket.

15. The ball and socket joint of claim 14, wherein said outer peripheral surface of said inner bearing is tapered.

16. The ball and socket joint of claim 14, further including a retaining ring, positioned within said cavity of said socket and adjacent to said inner bearing.

17. The ball and socket joint of claim 14, wherein said inner bearing includes an opening that extends axially between said inner seat face of said inner bearing and one of said two opposing axial surfaces of said inner bearing to supply lubricant to said ball and socket joint.

18. The ball and socket joint of claim 17, further including a retaining ring having an opening that aligns with said opening of said inner bearing, said opening of said retaining ring adapted to receive a fitting to supply lubricant to said ball and socket joint.

* * * * *